INVENTORS.
JAMES H. GREEN, JR.,
and JERRY GORDON
BY
Spencer E. Olson
ATTORNEY.

Dec. 18, 1962 J. H. GREEN, JR., ET AL 3,069,657

SELECTIVE CALLING SYSTEM

Filed June 11, 1958 4 Sheets-Sheet 2

INVENTORS.
JAMES H. GREEN, JR.
and JERRY GORDON

BY *Spencer E. Olson*

ATTORNEY.

Dec. 18, 1962 J. H. GREEN, JR., ET AL 3,069,657

SELECTIVE CALLING SYSTEM

Filed June 11, 1958 4 Sheets-Sheet 3

INVENTORS.
JAMES H. GREEN, JR.,
and JERRY GORDON

BY Spencer E. Olson

ATTORNEY.

INVENTORS.
JAMES H. GREEN, JR.,
and JERRY GORDON

BY Spencer E. Olson
ATTORNEY

United States Patent Office 3,069,657
Patented Dec. 18, 1962

3,069,657

SELECTIVE CALLING SYSTEM

James H. Green, Jr., Snyder, and Jerry Gordon, Buffalo, N.Y., assignors, by mesne assignments, to Sylvania Electric Products Inc., Wilmington, Del., a corporation of Delaware Filed June 11, 1958, Ser. No. 741,354
20 Claims. (Cl. 340—171)

This invention relates to communication systems, and more particularly to a selective signaling system, in which a particular receiver among many similar receivers is notified that it is being called by the transmitter associated with the system.

Signaling systems of this type are useful in many applications, among them mobile radio systems of the type employed by taxi cab companies or police departments, for example, in which the mobile receivers are called from a central transmitting station. It is the usual practice in present systems of this kind to broadcast a transmission which is received by all of the receivers, the addressee of a particular communication being alerted by a call number. This type of system has the obvious disadvantage that the communication is not private; i.e., all receivers tuned to the transmitter frequency can receive a transmission intended for a specific receiver.

Some attempts have been made to overcome this disadvantage through the use of a multiplicity of frequencies, with each receiver in the system tuned to a particular frequency. In such a system, obviously, the transmitter must be capable of transmitting on a like multiplicity of frequencies which complicates the transmitter equipment. Moreover, since the frequency band allocated for this type of service is relatively narrow it is difficult and expensive to get a sufficiently large number of individual channels in the allocated band without the introduction of objectionable cross talk between channels.

It is a primary object of the present invention to provide a selective signaling system having a single relatively simple transmitter capable of signaling only a selected one of a large plurality of receivers.

Another object of the invention is to provide a selective signaling system having the general characteristics described above capable of providing a very large number of addresses in a very narrow frequency band.

Another object of the invention is to provide a selective signaling system employing less complex equipment, and consuming considerably less power, than previous signaling systems of this type.

Another object of the invention is to provide a selective signaling system adaptable to control functions.

These and other objects are attained in accordance with the present invention by a system including a transmitter which generates a call signal consisting of two tone signals which are turned on or off according to the command of two binary sequences which are identical in structure, but displaced in time by a selected discrete interval, wherein each displacement determines a different calling signal, or address. The transmitter includes an encoder, in which the first tone signal is modulated by a particular binary sequence of a length determined by the required number of addresses, and the second tone is modulated by the same sequence after the sequence has been delayed by a desired time interval. The two tones are then transmitted as energy bursts whose "on" times are determined by the "up" or "down" states of the binary sequences used as modulating signals. There being as many discrete phase relationships between the two binary sequences as there are bits in the sequence, and this phase relationship being the determinant as to which receiver will be called, it will be apparent that a large number of receivers can be selectively called. Each of the receivers includes a decoder which detects the two binary sequences employed. The binary sequence detected from the first tone is injected into a storage device and suitably operated upon by an appropriate logic network to generate a delayed version of the sequence, the delay representing the address of a particular receiver. The binary sequence stripped off the second tone is compared to the output of the logic network, and if the resulting time separation between these two sequences is zero, the decoder will activate its signaling control circuit. If the time separation between the two binary sequences is not zero, indicating that that particular receiver is not being called, the signal circuit will remain quiescent. Each of the receivers of a particular system is identical with the others except for a different logic network. By a simple change of the logic circuit connected to the storage device, which may be a shift register, it is possible to set up as many receivers which will respond to a specific address as there are bits in the binary sequence employed. For example, if a 255 binary bit sequence sequence is used, 255 receivers may be set up to be selectively called or, if a 511 bit sequence is used, the system may include 511 receivers, and so on.

For a better understanding of the present invention together with other and further objects and features thereof, reference is had to the following description taken in connection with the accompanying drawing in which.

Figure 1A:
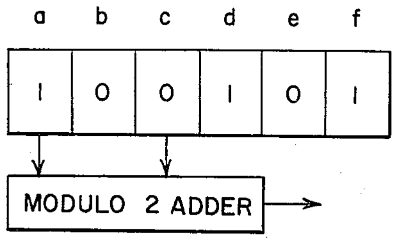
FIGS. 1A, 1B and 2 are diagrams illustrating how recurring binary sequences may be generated and delayed versions obtained.
Figure 1B:
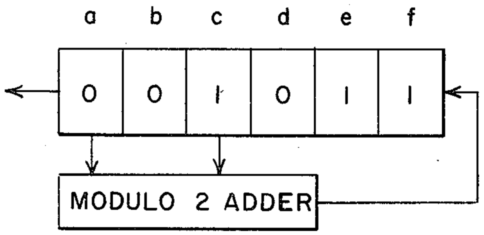
Figure 2:
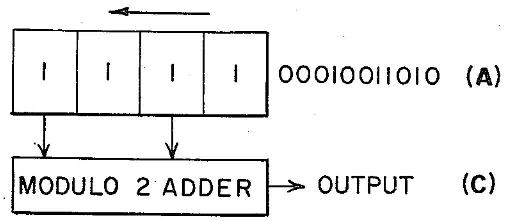

In the attainment of the objects of the invention, the unique characteristics of the sequences of binary digits known as "maximum length shift register sequences" are utilized to provide the multiple addresses. Referring to FIGS. 1A and 2, maximum length shift register sequences can be generated in the following fashion. If, as in FIG. 1A, a series of storage elements, such as bistable elements of a shift register, *a* through *f*, is loaded with a succession of binary digits, modulo 2 addition may be performed on the contents of two or more of the storage cells. As is well known in the art, to express one number, say X, as the modulus of another number Y, X is divided by Y and the remainder used as the answer. That is, 35 modulus 4 equals 3, 30 modulus 6 equals 0, and 2 modulus 2 equals 0. It will be apparent that any number modulus 2 will give a result of 1 if the number is odd, and a result of zero if the number is even. A circuit known as a modulo 2 adder, or "odd parity check," is widely used in binary systems, such as computers, for making this determination. The theory of modulo 2 addition is covered in many texts relating to the theory of numbers, such as "First Course in the Theory of Numbers," Harry N. Wright, John Wiley & Sons, Inc., Chapter 3. If the storage elements are connected as shifting registers, upon the application of a shifting pulse the contents of all storage elements are transferred one unit to the left. Simultaneously, the result of the modulo 2 addition is introduced into the storage cell left empty, as in FIG. 1B. As this process is repeated, a succession of binary digits will pass through the storage element "a." It will be apparent that this sequence of binary digits passing through storage element "a," which is called a "word," will be periodic. Indeed, for a certain length of shift register, "n," and for certain corresponding inputs from the register to the modulo 2 adder, the resulting word may be as long as $2^n-1$. Sequences of length $2^n-1$ generated in this manner are called "maximum length shift register sequences," abbreviated "M-sequences" for convenience. Sequences of length $2^n-1$ generated in this manner have been reported in the literature, an article by D. A. Huffman entitled "The Synthesis of Linear Sequential Coding Networks" appearing in proceedings of the Third London Symposium on Information Theory of September 13, 1955, being representative. Such a sequence has the property that if compared elementwise with any shifted version of itself (that is, a cyclic permutation of itself) one more disagreement than agreement will result, making the sequence very useful as elements of a selective calling code.

Consider now a selective calling system where the addresses are transmitted by generating an M-sequence of length $L=2^n-1$ and one of the L possible cyclical permutations or shifts of the same sequence. The "address" will be determined by the number of shifts between the two versions of the M-sequence transmitted. For example, consider the M-sequence:

111100010011010

If the following sequences are simultaneously transmitted (A) 111100010011010
and
(B) 111000100110101 it will be seen that there has been transmitted address number 1 if shifts to the left of sequence (B) are used as the index. Similarly transmitting (A) 111100010011010
and
(B) 000100110101111 would correspond to address number 4 under the same convention.

In this example, in which the sequence is 15 bits long, it is clear that 15 such addresses exist. While 15 addresses might be satisfactory in certain systems, normally a larger number would be required which is readily accomplished by lengthening the sequences as desired. Although the above-entitled Huffman paper is highly analytical and explains the generation of "M-sequences" in mathematical symbol form, applicants have concluded from the analysis that M-sequences of length $2^n-1$ may be generated by performing modulo 2 addition on selected outputs of an n-bit register and using the output of the modulo 2 adder as the input to the first element of the register. For any shift register of length n there exists M different sequences. The number of sequences that can be obtained can be calculated, but because of the highly complex mathematical computations involved in selecting which stages of the register must be connected to the modulo 2 adder to generate the maximum length sequence, in most cases it is easier to determine this by empirical methods. For example, it has been found that if the outputs of the first and third stages of a four-bit shift register are applied to the modulo 2 adder, an "M-sequence" of 15 bits results. If it is desired to generate "M-sequences" using 8-, 9-, or 10-bit registers, or registers of any other length, they can be generated by selecting the proper shift register elements for connection to the inputs of the modulo 2 adder. Using a similar empirical approach, maximum length sequences of $2^8-1$ equals 255, or $2^9-1$ equals 511, or $2^{10}-1$ equals 1023, can be generated by choosing the proper input to the modulo 2 adder from shift registers having lengths of 8, 9 and 10 bits, respectively.

The following general consideration of the selective decoding equipment employed in the receiver of the present system will demonstrate the unique advantage of using M-sequences as addresses. It is a characteristic of M-sequences that shifted versions of any M-sequence of length $2^n-1$ can be produced by modulo 2 addition upon selected elements of an n-unit shift register as the M-sequence is shifted through the register. If, for example, the M-sequence described above is shifted through a 4-bit register with modulo 2 addition being performed on the contents of register positions 1 and 3, as illustrated in FIG. 2, clearly the result will be A (input) 111100010011010
C (output) 001101011110001 which is address number 8 according to the conventional established earlier.

After this sequence (or the sequence appropriate to the receiver address) has been derived from the incoming A sequence it is compared with the incoming B sequence. A storage is provided which collects one positive unit for each agreement between sequences C and B and one negative unit for each disagreement of the length L of the sequence. Obviously, if the receiver is receiving its own address, i.e. $B \equiv C$, then after the M-sequence and its shifted version have passed through the receiver, L units will have been collected in the storage. If, however, $B \not\equiv C$ and the call is not the one built into the receiver, then by the property of M-sequences described above, the contents of the storage after the passage of a sequence of any length will be insufficient to actuate the call circuit. The rejection factor, $S/N$, between correct and incorrect calls will therefore be $$S/N=(L/1)^2$$

where S is the correct or wanted address and N is an incorrect address. As was mentioned earlier, if an "M-sequence" is compared with a shifted version of itself, there will be one more disagreement than agreement. This occurs when the wrong address is received by a particular receiver. As has been noted, the A sequence is shifted by the logic circuit in the receiver and the generated word C compared with the incoming B sequence. If the address is wrong, the B and C sequences, although the same "M-sequence," are shifted relative to each other with the result that when they are compared the net result is $-1$ because there is one more disagreement than agreement. If the signal received is the correct call signal for a particular receiver, the shifted A sequence and the incoming B sequence are in phase; that is, there is bit-to-bit agreement between the two sequences. For each agreement between the shifted A sequence and the incoming B sequence, a positive unit is put into the storage circuit with the consequence that if the sequences have a length of L, there will be L units in the storage after a complete sequence has passed through. Accordingly, the ratio of collected units for a correct call as compared to an incorrect call is L to 1. In the present equipment where these units are manifested as units of voltage, if the factor S/N is to be expressed as a power ratio, the ratio L to 1 must be squared as indicated.

Since in selective signaling systems, sequences are contemplated in which L is well in excess of 100, rejection ratios far in excess of 40 db are theoretically obtainable. In actual practice, since such large $S/N$ factors are not usually needed, the summations are not carried to the full length of the sequence, so as to speed signaling times and reduce equipment complexity.

Having described the general theory of operation of the present system, the encoder or transmitter portion of the system, illustrated in block diagram form in FIG. 3, will now be described. By way of example, the system will be described as a 511 address system, to correspond to the system shown in complete circuit diagram in FIGS. 7 and 8 to be described later. The encoder includes two shift registers 10 and 12, respectively designated shift register A and shift register B, each having nine storage elements.

Figure 5:
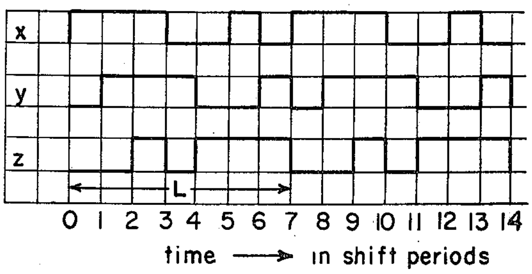
FIG. 5 is a series of wave forms illustrating a binary sequence displaced in time from the same sequence.

Shift registers 10 and 12 each have a logic circuit 14 and 16 respectively associated therewith which performs an odd parity check on two elements of the register to determine the input to the shift register. The word generated by this arrangement is 511 bits long, this being the longest M-sequence obtainable from a 9 store shift register using simple logic. The shift registers 10 and 12 are electrically the same, as are logic circuits 14 and 16, with the consequence that the word A generated by register 10 is the same as word B generated by shift register 12. Corresponding parts of the words, however, may be displaced in time, this displacement affording the unique addresses on which the present system is based. By way of illustration, in FIG. 5 two cycles of a 7-bit word are shown at $x$, the same word displaced by 1 bit at $y$, and by 4 bits at $z$. Upon examination it will be seen that in a 7-bit word there are 7 discrete displacements possible. Similarly, in a 511-bit word there are 511 discrete displacements obtainable, each 1-bit displacement determining an address.

Associated with shift register 12 are a plurality of address selector switches 18, one for each storage element of the register, which perform the function of establishing the phase displacement between word B and word A. By the selective setting of these nine switches, it is possible to obtain the aforementioned 511 discrete displacements of word B from word A. The address selector switches, together with a "Set-Call" circuit 20 establish the phase relationship between the two words generated in the encoder and determine when the transmission occurs. Both of shift registers 10 and 12 are shifted by pulses from the same trigger generator 22, and accordingly are shifted at the same rate; that is, shift registers A and B are shifted in synchronism. To effect separation of the two words at the receiver, two modulation frequencies, designated $F_1$ and $F_2$, are transmitted, these being respectively generated by oscillator 24 and oscillator 26. The outputs from these two oscillators, and the two binary functions from shift registers 10 and 12 are applied to an output control circuit 28 which controls the output from terminal 30. The output signal at 30 may be used to modulate a carrier signal for the wireless transmission of the calling signal, or it may be transmitted over wires to a plurality of receivers each connected to terminal 30.

Figure 6:
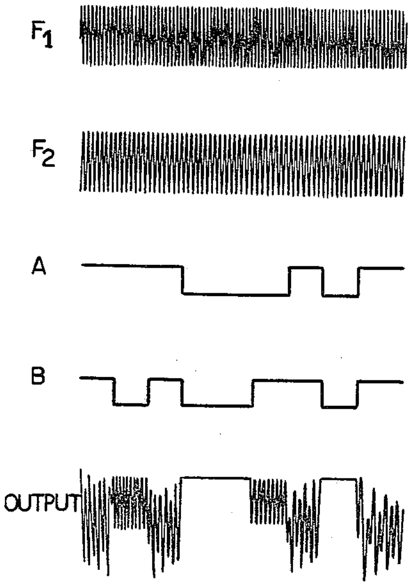
FIG. 6 is a series of wave forms which illustrate the operation of the encoder of FIG. 3.

FIG. 6 illustrates the nature of the wave forms applied to output control circuit 28 and the resultant modulating signal for an R-F or D.C. carrier. In this figure, $F_1$ is the wave form of the oscillation generated by oscillator 24 (oscillator A) and $F_2$ is the wave form from oscillator 26 (oscillator B), $F_1$ and $F_2$ preferably being at audio and differing sufficiently in frequency to be readily separated with conventional filters. The wave form designated A is a part of the word from shift register 10(A) and the wave form designated B is a part of the word from shift register 12(B) for the same period of time. Output control circuit 28 is so arranged that word A controls whether signal $F_1$ is sent out and word B controls whether signal $F_2$ is sent out. These four signals together make up the calling signal which will selectively call one, and only one, receiver in the system. From FIG. 6 and the foregoing description, it will be seen that:

Word Carrier Output $$A+\overline{B}+F_1+F_2=F_1$$
$$\overline{A}+B+F_1+F_2=F_2$$
$$\overline{A}+\overline{B}+F_1+F_2=\text{No carrier}$$
$$A+B+F_1+F_2=F_1+F_2$$

The "Set-Call" circuit 20 determines whether or not this output signal is transmitted.

The transmission of the calling signal may be made by any conventional method; for example, the call signal at terminal 30 may be used to modulate a higher frequency carrier which may be transmitted and received at a conventional receiver where the call is detected.

Figure 4:
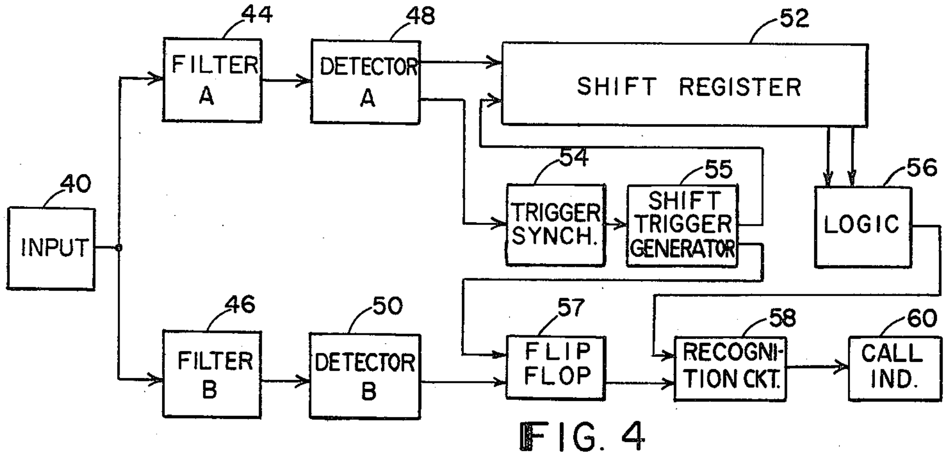
FIG. 4 is a block diagram of the decoder of the receivers of the system.

Alternatively, the dual modulated D.C. carrier illustrated in FIG. 6 may be transmitted over wires to the receivers. Also, the signals $F_1$ and $F_2$ used in the call signal may be broadcasted and detected by receivers tuned to these two frequencies. Accordingly, the input circuit 40 of the decoder of FIG. 4 may take a variety of forms, depending upon the method of transmission employed. If the calling signal is used to modulate an R-F carrier, block 40 would include a receiver tuned to the carrier frequency including a detector for detecting the modulating signal. If $F_1$ and $F_2$ are transmitted directly, either by wire or wireless transmission, input circuit 40 may simply be an amplifier or an input terminal. Whatever the nature of the input circuit, the two frequencies $F_1$ and $F_2$ are respectively filtered by filters 44 and 46, the output of filter 44(A) being pulses or bursts of energy at frequency $F_1$ modulated like the signal that would be sent from the encoder if only shift register 10(A) and oscillator 24(A) were used. Similarly, the output of filter 46(B) is like that generated by oscillator 26(B) and shift register 12(B) only. The signals from filters 44 and 46 are respectively applied to detectors 48 and 50 to derive the pulse envelopes, which correspond to the wave forms A and B of FIG. 6. The outputs of detectors 48 and 50 are therefore identical in structure to the outputs of the two shift registers in the encoder. The output of detector 48, that is word A, is applied to a shift register 52, also having nine storage elements in a 511-bit word system, and which is the same as shift registers 10 and 12 of the encoder. Since selective addressing depends upon the detection of small time displacements between similar words, shift register 52 must operate at the same rate as the encoder shift registers and thus must be synchronized to the encoder shift rate. This is accomplished by a trigger synch. Circuit 54 which derives its information from the detected word A; i.e., the output of detector 48. The address that is recognized by a particular receiver of the selective signaling system is determined by the logic 56 of the decoder. For the 511-bit word there are 511 discrete phase positions that word B may have relative to word A. Thus, if each receiver in a system including 511 receivers generates a word C which has one of these discrete phase conditions, there are 511 different receiver addresses obtainable. One of the properties of the words used in the addresses is that each of these 511 different cyclical permutations of the original word may be obtained by adding modulo 2 the contents of a combination of elements of shift register 52, the output of the modulo 2 adder being the delayed word. For example, a 2-element check may be used for one address, and a 9-element check may be used for another, and so on. The logic circuit 56, therefore, generates a word C which has the same structure as the word A (that is the output from detector 48) but delayed a discrete number of bits from word A. This word C, namely, the output of logic circuit 56, is compared in a recognition circuit 58 with the detected word B derived from detector 50.

To insure that leading and trailing edges of the pulses of word B are in correspondence with the corresponding edges of the pulses of word C generated by the register 52 and its associated logic circuit 56 (apart from deliberate phase displacement), the pulse sequence output of detector 50 is synchronized with word A (output of detector 48) by a flip-flop circuit 57 triggered by a shift trigger generator 55 which also controls the rate of shifting of register 52. That is, there are no circuit delays, such as might be introduced in the upper channel, between word C and word B when applied to recognition circuit 58. If the word C is in the same phase relationship to word A as word B is to word A, they are in phase and the recognition circuit will activate the call indicator. Another property of the words used in the present system is that the auto-correlation function is two valued, one value for correlation and another value for the word compared to itself at any out-of-phase position. It is the correlation value, that is, a change in D.C. level, that is recognized in recognition circuit 58 and used to activate a call indicator 60. The block 60 designated "Call Indicator" may take a variety of forms; for example, it may be a buzzer, a light, or a relay which is arranged to activate or initiate a control function.

It should be emphasized at this juncture that two words are transmitted by the encoder, the second having the same structure as the first but displaced therefrom in time by a discrete amount determined by the setting of address selector switches 18. These words are received at each of the receivers in the system, the first word being applied to a shift register and operated upon by a logic circuit to generate a third word which is then compared with the second word transmitted by the encoder. The nature of the code employed is such that if the third word is in the same phase relationship to the first word as the second word is to the first word, the third and second words are in phase and the receiver is actuated to indicate that it is being called. Thus, if 511 receivers are to be used in a system employing a 511-bit code, each of the receivers must have one of 511 different connections to logic circuits such as 56, each so functionally related to the settings of address selector switches 18 of the encoder as to generate a third word having the same phase relationship as the 511 distinct second words (B) that may be transmitted by the encoder. Basically, all 511 receivers are substantially the same, the only variation being the nature of logic circuit 56 and its connection to shift register 52.

Figure 7:
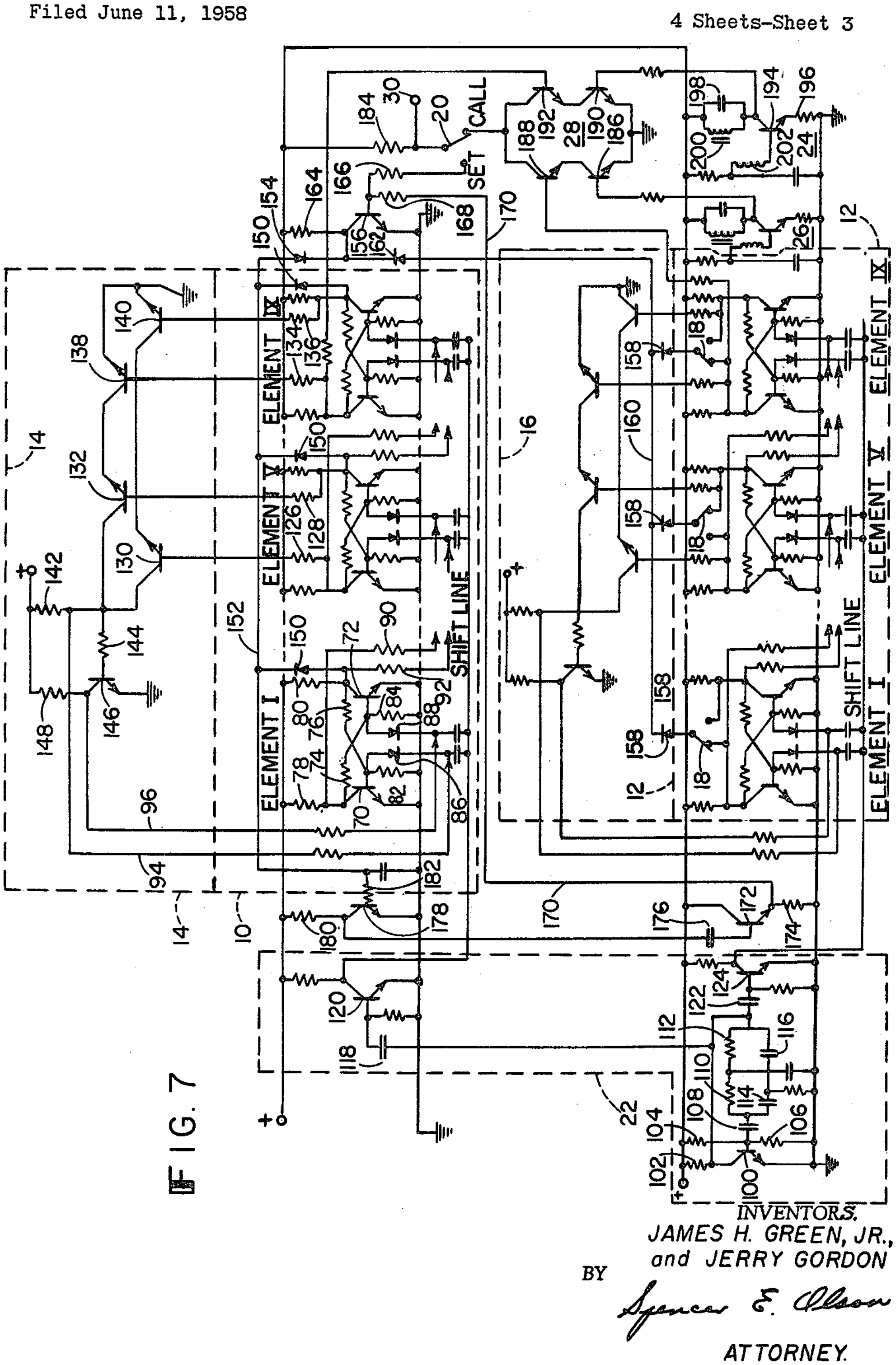
FIG. 7 is a circuit diagram of an operative embodiment of the encoder shown in FIG. 3.

FIG. 7 is a schematic diagram of a preferred embodiment of the encoder of the invention, which has been successfully operated. The circuit employs transistors and semi-conductor diodes throughout in the interest of low power consumption and small, light weight construction. Each of shift registers 10 and 12 is made up of nine transistorized flip-flop circuits, only three of which are illustrated, namely, the first, fifth and ninth stages of each, the remaining stages being identical to those shown and connected one to the other in the manner illustrated. The operation of shift registers employing flip-flops as the storage elements being well known, the elimination of these identical stages in the interest of clarity of the drawing will not detract from the understanding of the operation. Each of the storage elements comprises a flip-flop circuit having two transistors 70 and 72, the emitters of which are grounded and the collectors of which are cross-connected to the base of the other transistor via resistors 74 and 76. The collector of each is also connected through identical resistors 78 and 80, respectively, to a source of positive potential, and the base electrodes are respectively connected to ground through resistors 82 and 84, also of equal resistance. Resistors 78, 74 and 84, and 80, 76 and 82 form voltage divider networks which allow the flip-flop to assume either of two stable conditions; that is, with transistor 70 conducting and transistor 72 non-conducting, or with transistor 70 non-conducting and transistor 72 conducting. Trigger pulses are applied to the base electrodes of transistors 70 and 72 through diodes 86 and 88, respectively, the anodes of which are biased by the voltage developed across resistors 82 and 84, respectively, and the voltage on their cathodes being determined by the condition of the previous flip-flop stage, or in the case of element I, the condition of the logic circuit 14. In other words, the condition of element or stage I of shift register 10 determines the biasing of the diodes 86 and 88 in stage II through the coupling resistors 90 and 92 respectively connected to the collectors of transistors 70 and 72. During the quiescent period of any flip-flop, both diodes are biased off, but by virtue of the different voltage levels of the collectors of the transistors of the previous stage one diode has a back voltage of nearly B+ while the other is back-biased by only a fraction of a volt. Thus, upon application of a negative shift pulse to the Shift Line (from shift trigger generator 22 to be described), which is capacitively coupled to the cathode of each of the diodes, each flip-flop in the register assumes the stable condition that the preceding flip-flop was in before the shift. The shift spike tends to turn off both transistors of all stages of the register but only the transistor having the lower back-bias is turned off. The setting of the first flip-flop in both of shift registers 10 and 12 is determined by the status of their respective logic circuits 14 and 16; that is, by the potentials appearing on connections 94 and 96 respectively connecting the logic circuit 14 to the bases of transistors 70 and 72, and on the corresponding connections from logic circuit 16 to register 12.

Shift trigger pulses for shift registers 10 and 12 are generated by shift trigger generator 22 consisting of a twin-T oscillator and two peak-riding clipping circuits. The oscillator includes a transistor 100, the emitter of which is grounded, and the collector of which is connected through resistor 102 to a source of positive potential. The base of the transistor is connected to a source of positive potential and to ground through resistors 104 and 106, respectively. A regenerative loop including capacitor 108, resistors 110 and 112, and capacitors 114 and 116 connected between the base and collector of transistor 100, and including capacitive and resistive connections to ground from the junctions between resistors 110 and 112 and capacitors 114 and 116, respectively, causes a sine wave to be continuously generated at a frequency determined by the values of the resistors and capacitors in the feedback circuit. In an operative embodiment of the system, this oscillator was designed to operate at 400 c.p.s. The output of the oscillator is coupled through capacitor 118 to the base of transistor 120, connected as a peak-riding clipper, the output of which is a train of equally spaced negative pulses occurring at the frequency of the oscillator and applied to the Shift Line of shift register 10. The output of the oscillator is also applied through capacitor 122 to the base of transistor 124, also connected as a peak-riding clipper, the output of which, a like train of negative pulses, is applied to the Shift Line of shift register 12.

The logic circuits 14 and 16 for both of the shift registers 10 and 12 are the same, each being a 2-element parity check, using elements or stages V and IX of the respective registers, and since they are identical in structure, only logic circuit 14 will be described in detail. The collectors of the two transistors of the flip-flop of element V are respectively connected through resistors 126 and 128 to the base electrodes of transistors 130 and 132. The collectors of the two transistors of flip-flop element IX are similarly connected through resistors 134 and 136 to the base electrodes of transistors 138 and 140, respectively. The emitters of transistors 130 and 132 are respectively connected to the collectors of transistors 138 and 140 as shown, and the emitters of transistors 138 and 140 are grounded. The collectors of transistors 130 and 132 are connected together and through resistor 142 to a source of positive potential and through resistor 144 to the base of transistor 146. The emitter of transistor 146 is also grounded, and the collector is connected through resistor 148 to a source of positive potential. Connections 94 and 96, previously mentioned, couple the output of the logic circuit to the first stage, element I, of the shift register, specifically to the bases of transistors 70 and 72 of that element.

The circuit just described performs an odd-parity check on elements V and IX of the shift register. With the described arrangement, a "1" in only one of these flip-flops and a "0" in the other causes a "1" to be set into the first flip-flop, element I, of the shift register, and two "1's" or two "0's" sets a "0" into this stage. As has been previously noted, with the described shift register having nine storage elements, and a logic circuit which performs an odd parity check on two of the elements, in this instance elements V and IX, a word 511 bits long is generated. It is, of course, understood that shift register 12, also nine elements long and employing the same logic, is also capable of generating the same 511 bit word, in synchronism with the output of shift register 10, since both are shifted by pulses from the same shift trigger generator 22.

Returning now to shift register 10(A) the collector of one of the transistors of each element or stage (for example the transistor 72 of element I) is connected by a diode 150 to line 152 which holds these collectors at substantially ground potential when conduction in transistor 156 occurs. The line 152 is connected to the collector of transistor 156 through diode 154, polarized as shown. Similarly, one or the other of the collectors of the transistors of the shift register elements of register 12 (depending upon the setting of switches 18 which will be described in more detail) are connected via diodes 158 and line 160, and through diode 162, polarized as shown, to the collector of transistor 156. The collector of this transistor is also connected to a source of positive potential through resistor 164, and the emitter is grounded as shown. The base of transistor 156 is connected through resistor 166 to the "Set" terminal of "Set-Call" switch 20, and also through resistor 168 and line 170 to the emitter of transistor 172, the latter also being connected to ground through resistor 174. The collector of transistor 172 is connected to a source of positive potential, and the base is connected through capacitor 176 to the collector of transistor 178. The emitter of transistor 178 is grounded and the collector is connected through resistor 180 to a source of positive potential, and its base is connected through resistor 182 to line 152. The function of transistors 172 and 178 and the above-described associated circuitry is to "re-educate," that is, reset the contents of shift register 12 each time the word in register 10 has come full cycle and all nine of the stages of shift register 10 are set to "1," its starting condition for each call. The right-hand transistor in each of the flip-flop stages of register 10 is conducting during this "all ones" condition with the consequence that the potential on line 152 and at the base of transistor 178 is reduced to substantially zero and the transistor is cut off thereby producing a positive pulse at the collector of transistor 178 and at the base of transistor 172, which is connected as an emitter follower. This pulse is applied, via connection 170, to the base of transistor 156 where it produces the same effect as does closing of "Set" switch 20 for a period sufficiently long to bring the stages of both of shift registers 10 and 12 to their settings at the initiation of a call. The manner in which the stages of shift registers 10 and 12 are initially set, and how "Set-Call" switch 20 contributes to this function, will now be described.

Shift register 12 differs from shift register 10 in the provision of switches 18 whereby the collector of one or the other of the transistors of each of the flip-flop stages may be selectively connected, via diodes 158, line 160, and diode 162 to the base of transistor 156. The setting of switches 18 establishes the phase relationship between the word generated in shift register 12 and that generated in shift register 10. Since there are as many combinations of switch settings as there are conditions of stability in the nine element register, namely, $2^9$, there are 512 possible conditions. The condition of all zeros in register 12 is not used, however, making the usable number of starting conditions 512 minus 1, or 511.

A single switch, "Set-Call" switch 20, in circuit with both shift registers and the output control circuit 28, sets the proper contents into both registers preparatory to generating a calling signal, and couples the outputs of the registers to the output circuit. In the illustrated system, it is convenient to set the register 10 to "all ones" preparatory to sending a call; that is, all nine stages are initially set to the condition where the right hand transistor is conducting, this condition being designated a "one." This is accomplished by putting switch 20 in the "Set" position, so as to connect the base of transistor 156 to B+ through resistors 166 and 184. The positive potential thus applied to the base electrode turns transistor 156 on thereby connecting the collectors of the right hand transistors of the flip-flop stages of register 10, via diodes 150, line 152, and diode 154, to substantially ground potential. Thus, the potential on the collectors of all of the right hand transistors is "down," the condition indicating a "one," this condition being maintained until the bias is removed from the base of transistor 156 by opening the "Set" switch. Similarly, when switch 20 is in the "Set" position, the stages of shift register 12 are set to a selectable initial condition as determined by the positions of switches 18. Employing the same convention, with the switch 18 of element I in the position shown, the collector of its left hand transistor is held at substantially ground potential, via diode 158, line 160, diode 162, and transistor 156, indicating a "zero" in this stage. In the same manner, element V is set to "one" and element IX is set to "zero." Each of the remaining switches 18 of register 12 may be set to one or the other position, of which there are 511 different usable possibilities, each different setting providing a unique discrete displacement from the "all ones" condition of shift register 10. So long as switch 20 is in the "Set" position, with the collectors of the right hand transistors of the stages of register 10 and the collectors of one or the other transistor of each of the stages of register 12 maintained substantially at ground potential, shift pulses applied to their respective Shift Lines from trigger generator 22 are ineffective to shift the registers.

Briefly summarizing the manner in which the two generated words are set up in the encoder, a selected part of the word A is read into the shift register 10 by bringing the potential of read-in line 152 near to ground potential. This is accomplished by placing "Set-Call" switch 20 in the "Set" position. With switch 20 in this position, transistor 156 is rendered conducting causing its collector electrode to approach ground potential thereby turning on diode 154 to bring the potential on line 152 near to ground. The A word initially read into register 10 is utilized as the zero reference condition and any displacement of word B will be with reference to this initial setting. There being a place in an "M-sequence" of 511-bit length where there are nine consecutive "ones," it is convenient from the standpoint of recognizing the part of the word initially stored in shift register 10 to set all of the elements of register 10 to the "one" condition. This is accomplished by the diodes 150 connected from the collectors of the right hand transistor of each of the nine flip-flops of the register to the read-in line 152, the indicated polarity of the diodes 150 insuring that a "one" is read into all of the stages of the register when the "Set" switch 20 is closed.

The read-in line 160 for shift register 12 is also connected, through diode 162, to the collector of transistor 156. After the starting condition of word A is inserted or read into shift register 10, the staring condition of word B is read into the shift register 12. The starting condition of word B may be any one of 511 possible conditions determined by the positions of switches 18 connected to the nine elements of the shift register. These nine single-pole double-throw switches may each be in one of two conditions, to the left, or to the right, giving $2^9$ or 512 possible combinations of settings. Since an initial setting of all zeros would result in the generation of one B word corresponding bit-by-bit with word A, and thus provide no selectivity, the condition of all "zeros" is not used, making the number of usable possible starting conditions in shift register 12 equal to 512 minus 1 or 511. Each of these 511 possible conditions determines an address because each represents a different starting phase of word B relative to word A. Since, as has been noted, the reference word A always starts in the same condition, each of the possible conditions of starting word B have a different phase relationship to that of shift register 10. The starting condition of both registers 10 and 12 remain stable so long as "Set-Call' switch 20 is in the "Set" condition.

With the two registers thus set up, and switch 20 moved to the "Call" position, the positive bias is removed from the base of transistor 156 causing it to cease conducting, thereby allowing both registers to shift under control of the shift pulses from trigger generator 22, and output circuit 28 is energized through resistor 184. Each register then, and its associated logic circuit, operates to generate a 511-bit word, the word from register 12 being displaced from the word from register 10 as determined by the initial contents of register 12. To insure that the proper phase displacement is maintained as the words are repeated, shift register 12 is reset to its initial condition each time the contents of register 10 are "all ones" (its initial condition), by the action of transistors 172 and 178 previously described.

Output control circuit 28 consists of two "and" gates comprising transistors 186 and 188, and transistors 190 and 192 connected as shown, resistor 184 constituting a common load resistance across which the output signal is developed. The collector of the left-hand transistor of element IX of shift register 10 is connected to the base of transistor 192, whereby word A is applied thereto, and the collector of the left-hand transistor of element IX of shift register 12 is similarly connected to the base of transistor 188 so as to apply word B thereto. Carrier signals of differing frequencies, $F_1$ and $F_2$, generated by oscillators 24 and 26, are respectively applied to the base electrodes of transistors 186 and 190. Except for the frequency determining parameters, oscillators 24 and 26 are identical, each including a transistor 194, the emitter of which is conected to ground through resistor 196 and the collector of which is connected to a source of positive potential through a parallel combination of capacitor 198 and inductance 200. Coupling between the collector and base of the transistor is afforded by inductance 202 inductively coupled to coil 200. Oscillators 24 and 26 preferably operate at audio frequencies, in an operation model being 3.3 kc. and 4.8 kc., respectively.

Figure 3:
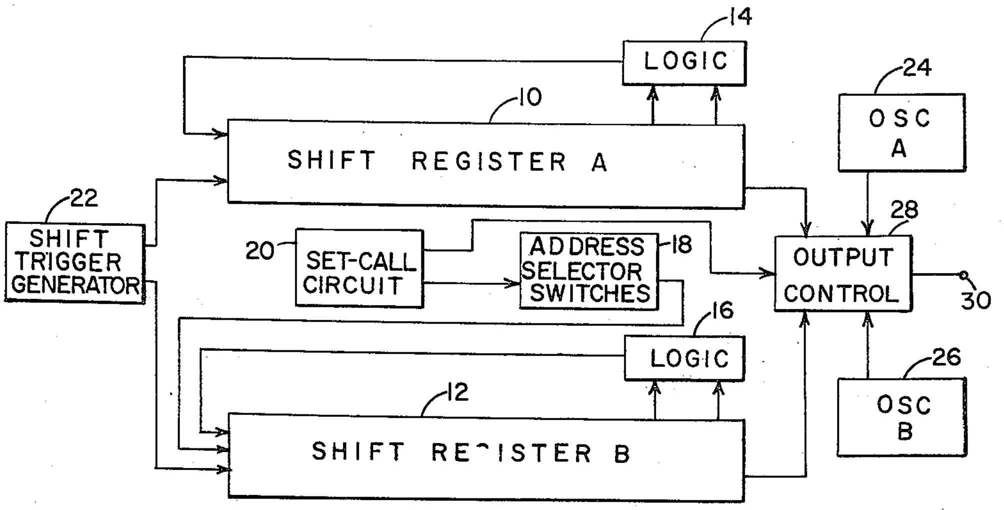
FIG. 3 is a block diagram of a preferred embodiment of the encoder of the selective signaling system of the invention.

Paraphrasing the description of operation of the output circuit which was presented in connection with a discussion of the block diagram of FIG. 3, the outputs of oscillators 24 and 26 are continuously applied to the output control circuit and the words coupled to the output control circuit from shift registers 10 and 12 determine which, if any, of the two frequencies appear at output terminal 30. Thus, if a part of word A occurs at a particular time and there is no element of word B present, a burst of energy at the frequency of oscillator 24 is delivered to terminal 30 for the duration of the occurring part of word A. Conversely, if word B is present and not word A, the output is at frequency $F_2$, namely the frequency of oscillator 26, for the duration of the occurring part of word B. If at a particular instant neither word A nor word B is present, no modulation signal is transmitted, and if both occur simultaneously, both signals are transmitted. It will be seen that so long as the switch 20 is in the "Call" position, the encoder will continue to send the address established by the setting of switches 18; that is, it will repeat sending the same 511-bit word until switch 20 is opened. Normally, however, it is not necessary to repeat the word, and indeed it may be unnecessary to send the whole 511-bit word even once to activate the called receiver, for the decoder of the receiver is designed to recognize whether it is being called upon receipt of approximately half of the code word. Thus, with a shift rate of 400 pulses/sec., it requires about 1.28 seconds to generate a complete 511-bit word, or a little over 0.5 second to actuate the receiver. With this very short time for completing a call, and since at most nine switches have to be manipulated to establish a new address, it is possible for an operator having a chart correlating settings of switches 18 with its corresponding address, to call a large proportion of the receivers of the system in a very short time.

A preliminary model of the encoder just described, which has been successfully operated, has been packaged on a chassis of about the same size and volume as a carton of cigarettes. Since transistors are used throughout, the circuit may be operated at 3 volts and the total power consumption is about 120 milliwatts. No precision components are used in the system.

Figure 8:
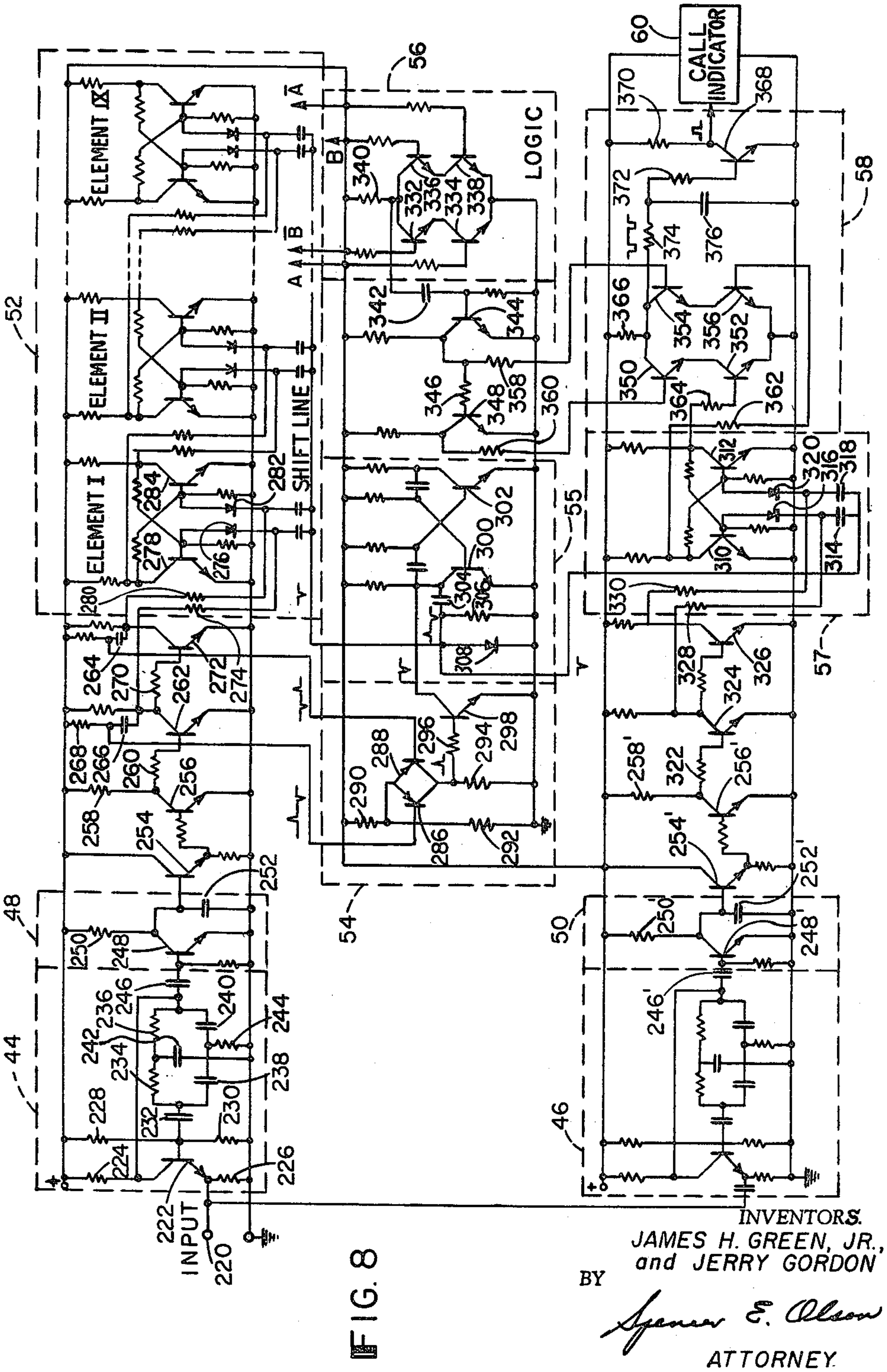
FIG. 8 is a circuit diagram of a preferred form of the decoder shown in block diagram form in FIG. 4.

Having described the encoder of the present signaling system, and the nature of the transmission therefrom, reference is now made to FIG. 8 for a detailed discussion of an operative embodiment of the decoder portion of the system, such as would be incorporated in each of the receivers. Upon reception of the calling signal at the receiver it is suitably demodulated (if an R.F. carrier is used) to derive the calling signal generated at terminal 30 of the encoder. If wire transmission is used, of course, an R.F. receiver would be unnecessary. The calling signal (bursts of energy at $F_1$ and $F_2$ respectively modulated in accordance with words A and B) is coupled to input terminal 220 and applied in parallel to filters 44 and 46 which are respectively tuned to the frequencies of the oscillators 24 and 26 of the encoder. These filters may take a variety of forms, the ones illustrated being of the twin-T type, each including a transistor 222, the collector of which is connected through resistor 224 to a source of positive potential, and the emitter connected to ground through resistor 226. The base of transistor is biased by the voltage divider comprising resistors 228 and 230, and is connected to the collector through the series-parallel combination of capacitor 232, resistors 234 and 236 and capacitors 238 and 240. The junction of resistors 234 and 236 is connected to ground through capacitor 242, and the junction of the capacitors is grounded through resistor 244. The filters operate similarly to the twin-T oscillator of trigger generator 22 of the encoder, the frequency-determining parameters being selected whereby signals of $F_1$ and $F_2$ are respectively passed by filters 44 and 46.

The output of filter 44 is coupled through capacitor 246 to the base of transistor 248, the emitter of which is grounded and whose collector is connected through resistor 250 to B+ and through capacitor 252 to ground. This circuit detects the rough envelope of word A, which is developed across capacitor 252, and the signal is then coupled via an emitter follower circuit including transistor 254 (provided for impedance matching) to an amplifier and clipper circuit. The latter includes transistor 256 having its emitter grounded and its collector connected through resistor 258 to B+, and functions to shape the pulses of word A. After filtering in filter 46, word B is similarly treated in the lower channel, corresponding components of which are designated by primed numerals.

Returning now to the upper channel, the pulses of word A are coupled from the collector of transistor 256 through resistor 260 to the base of transistor 262, the collector of which is connected to B+ through resistor 264, in parallel with which is connected the series combination of capacitor 266 and resistor 268. This circuit amplifies the pulses applied thereto, and its output is applied through resistor 270 to the base of a similarly connected transistor 272 to obtain at the collector of the latter the inverse of the signal appearing at the collector of transistor 262, whereby two-valued trigger pulses, corresponding to the pulses of word A, are provided for application to shift register 52. The collector of transistor 262 is connected through resistor 274 and diode 276 to the left hand transistor 278 of the first stage of register 52, and the collector of transistor 272 is connected through resistor 280 and diode 282 to the right hand transistor 284 of stage I, whereby the potentials at the collectors of transistors 262 and 272 (always of opposite value) determine the biasing of diodes 276 and 282 and the condition which the flip-flops will assume in response to the next shift pulse applied to the Shift Line of the register.

Synchronizing pulses for the shift trigger generator 55 are also derived from the amplifier and inverter circuits including transistors 262 and 272. The junction of resistor 268 and capacitor 266 is connected to the base of transistor 286 and the corresponding point in the circuit of transistor 272 is connected to the base of transistor 288. Transistors 286 and 288 are of the P-N-P type (all others in the system are N-P-N) and are connected in parallel with their emitters connected to a voltage divider consisting of resistors 290 and 292 and their collectors connected to ground through resistor 294. The voltage changes occurring at the collector of transistor 262 are differentiated by resistor 268 and capacitor 266, and the changes at the collector of transistor 272 are similarly differentiated. The resulting pulse trains of opposite polarity and each including positive and negative pulses, are respectively applied to the bases of transistors 286 and 288, and the collectors of the latter being negative with respect to the emitters, each time a negative pulse is applied to either base a positive synchronizing pulse appears on the collectors. It will be seen that a synchronizing pulse is produced for each change of word A, and remembering that the encoder is shifted at a rate of 400 pulses per second, when these synchronizing pulses occur their time separation is a multiple of 1/400 second and so they synchronize the decoder shift line at the encoder rate. These pulses are coupled through resistor 296 to the base of transistor 298, connected as an amplifier, where they are inverted prior to application to shift trigger generator 55.

Shift trigger generator 55 includes a pair of transistors 300 and 302 cross-connected as shown to provide a free-running multivibrator, the circuit components of which are chosen to give an operating frequency, in the absence of synchronizing pulses, of approximately 380 cycles per second. Upon application of negative synchronizing pulses from the collector of transistor 298 to the collector of transistor 300, however, the frequency of the multivibrator is locked to the frequency of the synchronizing pulses, in the present example, 400 cycles per second. The potential changes occurring at the collector of transistor 300 are differentiated by capacitor 304 and resistor 306, the positive pulses of the resulting pulse train are clipped by diode 308, and the remaining negative pulses are applied to the Shift Line of shift register 52 and to flip-flop 57, to be described.

Flip-flop 57 is of the same construction as a single stage of shift register 52 (and registers 10 and 12 of the encoder) and includes a pair of cross-connected transistors 310 and 312 to the bases of which synchronizing pulses, just described, are applied through capacitor 314 and diode 316 and capacitor 318 and diode 320, respectively. Thus, the condition of the flip-flop is altered in synchronism with the shifting of register 52, its conductivity state being determined by the biasing of the diodes, which will be seen presently is in accordance with the pulses of word B. It will be remembered that after filtering, detection and impedance matching, the pulses of word B are shaped by the circuit including transistor 256'. These shaped pulses are applied via resistor 322 to the base of transistor 324, connected as an amplifier, the output of which is inverted by transistor 326. Thus, the pulses of word B and their inverse respectively appear at the collectors of transistors 324 and 326. The collectors are respectively connected through resistors 328 and 330 to diodes 316 and 320 whereby the potentials at the collectors determine the biasing of the diodes and the condition which flip-flop 57 will assume in response to the next synchronizing pulse from shift trigger generator 55. Thus, it is seen that the output of flip-flop 57 is word B, synchronized however, with the pulses of word A, a condition necessary for the proper comparison of word B and a third word, word C, generated by shift register 52 and its associated logic circuit.

For the receiver to respond to a particular calling signal, that is to a particular discrete displacement of received word B from received word A, it is necessary that shift register 52 and its associated logic circuit generate, in response to received word A, a third word C displaced from word A by the same discrete interval by which word B is displaced from word A. As was noted earlier, using the 511-bit word of the present example, there are 511 discrete phase positions that word B may have relative to word A. One of the properties of the words used for the addresses is that each of the 511 different cyclical permutations of any word may be obtained by adding modulo 2 the contents of a combination of elements of a shift register, the output of the adder being the delayed word. To this end, the pulses of the A word, and their inverse, are applied to the first stage of a shift register 52 (in the manner described earlier) which is substantially identical with the two shift registers of the encoder, having nine storage elements, six of which, however, have been omitted from the drawing in the interest of clarity. As in the encoder registers, the output of each storage element, taken from the collectors of the two transistors of the stage, biases the diodes of the next stage thereby to determine the condition of the next stage upon application of the next shifting pulse. Thus, the word A applied to the first stage is cycled through the register, under control of shift trigger generator 55, at the same rate as it was initially generated in register 10 of the encoder.

In order for 511 receivers to be used in a system employing a 511-bit code, each must be capable of generating a different third word C which has the same displacement relative to word A as one of the 511 discrete displacements word B may have relative to word A. To accomplish this, the shift register 52 of each of the receivers must have one of 511 different connections to logic circuits, such as 56, each so functionally related to the address selector switches 18 of the encoder to generate a word C having one of the possible discrete displacements. Obviously, it is not feasible to illustrate the specific connections for 511 different arrangements of logic with shift register 52, and therefore a representative form is shown at 56 in FIG. 8. In this illustrative example, the logic circuit comprises two "AND" gates respectively including transistors 332 and 334, and 336 and 338. The collectors of transistors 332 and 336 are connected to B+ through resistor 340, and their emitters are respectively connected to the collectors of transistors 334 and 338, the emitters of the latter being grounded. The circuit is thus the same as the logic circuits 14 and 16 of the encoder, and as in those circuits, the base electrodes of transistors 334 and 338 are connected to the collectors of the two transistors of one of the nine flip-flops of shift register 52 and the base electrodes of transistors 332 and 336 are connected to the collectors of the transistors of another of the nine flip-flops. Since there are many possible connections of the logic circuit to the shift register, the described connections have not been illustrated. It will be readily apparent that there are thirty-six different ways in which circuit 56 can be connected to the nine-element shift register 52, whereby using two-element logic, thirty-six different displacements of word C from word A can be generated.

The word C, developed across resistor 340 is derived as follows: With the bases of transistors 334 and 338 connected to the opposite collectors of a flip-flop stage of the register, when the potential of one collector is "up" the other will be "down," designated by A and $\overline{A}$, respectively. Similarly, the potential applied tthe bases of transistors 332 and 336 are at any instant "down" and "up," or vice versa, designated $\overline{B}$ and B. It will be seen that when the potentials on the bases of both of transistors 332 and 334 is "up," or the potentials on both of 336 and 338 is "up," there will be conduction in resistor 340 and development of a pulse. The train of pulses resulting upon the cycling of word A through register 52 is a word C of the same structure as word A but displaced therefrom by a discrete interval. This amounts to modulo 2 addition of the two stages of register 52 to which logic circuit 56 is connected.

It was earlier mentioned that by using two-element logic of the type just described, thirty-six different word C displacements can be generated. The additional addresses for the system, assuming that a major proportion of the 511 possible addresses are to be used, may be generated by using three-element logic, four-element logic, and so on, up to nine-element logic. It will be appreciated, of course, that in the latter cases the circuitry will be increasingly more complex than the illustrated two-element logic.

The output of the logic circuit 56 is coupled via capacitor 342 to the base of transistor 344, connected as an amplifier, the output of which coupled through resistor 346 to the base of transistor 348, also connected as an amplifier to invert the signal appearing on the collector of transistor 344. Coupling capacitor 342 insures that only voltage swings developed across resistor 340 are coupled to the base of transistor 344 thereby to keep the latter cut-off in the absence of pulses, a factor important to the proper operation of the recognition circuit now to be described.

The recognition circuit 58, for comparing received word B with generated word C, consists of another pair of "AND" gates including transistors 350 and 352, and 354 and 356, connected as shown. The collectors of transistors 344 and 348, which are always of opposite value, are respectively connected through resistors 358 and 360 to the base electrode of transistors 354 and 350, and the collectors of transistors 310 and 312 of flip-flop 57, which likewise are one "up" and one "down" at all times, are respectively connected through resistors 362 and 364 to the base of transistors 356 and 352. Like the logic circuit 56, when the bases of both of transistors 350 and 352 are simultaneously "up," or the bases of transistors 354 and 356 are simultaneously "up," there is conduction in resistor 366, connected in series with both pairs of transistors, and the development of a pulse train. With proper phasing of amplifiers 344 and 348 with flip-flop 57, and with word C displaced from word A by the same interval that word B is displaced, that is, when words B and C are in time register, there is pulse-for-pulse correspondence between words B and C with the consequent generation of negative pulses at the collectors of transistors 350 and 354. The existence of such correspondence is indicated by a call indicator 60, which may be a buzzer or a light, which is normally maintained in a quiescent condition by a normally conducting transistor 368. The emiter of the transistor is grounded, its collector is connected to B+ through resistor 370, and in the absence of pulses, the transistor is rendered conducting by connection of its base to B+ through resistors 372, 374 and 366. Even upon the initial occurrence of negative pulses across resistor 366, conduction of transistor 368 is maintained by the charge on capacitor 376, connected from the junction of resistors 372 and 374 to ground. The time constant of the coupling circuit is selected such that after the occurrence of a predetermined number of negative pulses at the collectors of transistors 350 and 354, the potential of the upper plate of capacitor 376 with respect to ground is reduced sufficiently to cut transistor 368 off to activate call indicator 60. In an operative embodiment of the circuit, the circuit parameters where chosen to require the application of 171 negative pulses at a rate of 400 pulses per second (that is, pulse-to-pulse correspondence of 171 successive pulses in words B and C) before transistor 368 is cut off. This number of pulses, which it should be understood is not in any way limiting, precludes "false ringing," and accounts for the earlier statement that the receiver can recognize whether it is being called upon receipt of approximately half a word. In the absence of the proper calling signal for a particular receiver, that is, when the word C generated by the shift register and logic is not in time register with word B, there are sufficient disagreements between the pulses of the two words, regardless of the displacement interval, that not enough pulses are applied to capacitor 376 to cut transistor 368 off. Thus, each receiver responds to only its specific calling signal. Depending upon the application of the selective calling system, actuation of call indicator may be an instruction for the user to call his office phone, call a telephone central, or indicator 60 may be utilized automatically to initiate a control function.

Having described an operative embodiment of the invention in complete detail, it may be well to again review in general terms its mode of operation. In the encoder, two tone signals are turned on or off according to the commands of two binary sequences generated in the two shift registers, the two words being identical in structure but with one delayed by a predetermined number of bits from the other as determined by the setting of switches in the second register. In the described example, by proper setting of nine switches in the second register it is possible to transmit 511 discrete addresses, the address being the specific displacement of the second word from the first. At the receiver, the two tone signals are separated by filters, and the words carried by these respective tones detected. Each of the receivers used in the system whether it be 511 or some lesser number, includes a shift register, and a logic circuit unique to each receiver, arranged to generate a third word having the same displacement from the first as the second word from the first. A comparison is made between the third and second words, and if they are in the same phase relationship with respect to the first word the call indicator is activated.

While the invention has been described as being particularly applicable to personal communication systems, many other applications will be suggested to those skilled in the art. One important application to industrial control, for example, is the possibility of controlling from a central point the opening and closing of valves in a process system. Considering a specific example, one of the problems associated with a refinery and the storage of various fraction products in their respective tanks is the opening and closing of many valves at the proper time. At the present time, remotely operable valves are used, and are actuated either by an electrical signal coupled to the valve by wires, or by air pressure through air lines installed throughout the "oil farm." Installations of this kind, whether electrically or air operated, are obviously expensive, and should trouble develop in the circuitry or air lines, it is difficult to find and correct. By utilizing the system of the present invention, one of a plurality of receivers, each having a unique address, may be associated with each of the valves to be operated, and call indicator 60, instead of being a buzzer or bell, may be a relay for actuating a motor or other means for actuating the valve. Thus, with a single encoder located at a central point, an operator may selectively operate any one of 511 different valves located about an area. The receivers could be located and moved as desired, no interconnecting links to the transmitter being necessary.

From the foregoing it will be apparent that applicants have produced a unique signaling system which provides a large number of addresses and thus finds application in communication and control systems. The operation of the system has been described in connection with an operative embodiment utilizing transistors and semiconductors throughout, this construction being advantageous from the standpoint of lower power consumption, good reliability, and relatively simple equipment, but it will, of course, be understood that other components may be employed to perform the functions of the system. For example, in situations where weight, size and power consumption are not limitations, vacuum tubes could be used instead of transistors, and magnetic core shift registers could be used instead of the flip-flop registers described, so long as the desired wave shapes are obtained. Further, although a system having 511 possible addresses has been described, this too should be regarded as illustrative, as the invention may be arranged to have any number of addresses according to the function $2^n-1$; for example 255, 511, 1023, etc. Also, the number of addresses may be increased by transmitting more words than the two described in the foregoing example. That is, instead of only transmitting words A and B, by the addition of another channel in the encoder three words, A, B and C may be transmitted, with words B and C each displaced from word A by one of the $2^n-1$ possible displacements. In the receiver, the words are separated by three filters respectively tuned to the tone frequency associated with each word, and a single shift register, corresponding to register 52, with two logics in circuit therewith, generates two additional words D and E respectively displaced from word A by the same intervals that B and C are displaced from A. Employing recognition circuitry of the nature described in FIG. 8, in duplicate, word B is compared with word D, and word C is compared with word E, and if there is coincident correspondence between the four words the call indicator is actuated. It will be apparent that if this expedient is used with 511-bit words, the number of available addresses is $(511)^2$ or 261,121. Or, should 1023-bit words be used in a 3-word system, the number of addresses is increased to $(1023)^2$ or 1,046,529.

It will be recognized by those skilled in the art that any reasonable number of words may be transmitted, and compared at the receiver, to make available more addresses, the number being limited only by system complexity and available bandwidth. Thus, using four words in the calling signal, and only a 255-bit word, $(255)^3$ or 16,581,375 addresses are available, and by suitable combinations of words in the call signal, and word lengths, an extremely large number of unique addresses is possible. Such permutations and combinations are within the purview of the invention and while not specifically illustrated may readily be made by those skilled in the art having available the foregoing teaching.

What is claimed is:

1. A selective calling system comprising, a transmitter including means for generating N periodic pulse words of identical structure each including the same predetermined number of bits, N being an integer equal to two or greater, means for selectively displacing all of said pulse words except one relative to said one each by one of a plurality of discrete intervals, said plurality being equal to said predetermined number, and a plurality of receiving stations each including: N separate means for respectively detecting one of said generated pulse words, logic means operative in response to said one pulse word to produce $N-1$ pulse words of the same structure as said one word and each displaced relative to said one word by one of the discrete intervals by which the pulse words generated in said transmitter may be displaced from said one word, and means in circuit with said logic means and said detecting means and operative when all of said $N-1$ words produced in the receiver are simultaneously in time register with their corresponding detected pulse words to produce an indication that the receiver is being called.

2. The selective calling system according to claim 1 wherein the pulse word generating means in said transmitter includes N shift registers each having $n$ bistable elements, the shift registers being operative to generate identical pulse words each of a length equal to $2^n-1$ bits.

3. In a selective calling system, means for keying a pair of oscillators of first and second different frequencies on and off in accordance with first and second identical pulse sequencies displaced relative to each other by a one of a plurality of selectable discrete intervals, each discrete interval constituting an address, and a receiving station comprising first and second frequency selective devices respectively tuned to pass signals at said first and second frequencies, means coupled to said frequency selective means for detecting said first and second pulse sequences, means for determining the time displacement between the detected first and second pulse sequences, and indicating means operative to generate a control signal only when the displacement between the detected first and second pulse sequences is equal to said one discrete interval.

4. In a selective calling system, a transmitter including means for generating first and second maximum length shift register sequences of identical structure displaced relative to each other by one of a plurality of controllable discrete intervals, each discrete interval constituting an address, and a receiving station comprising means for separating and detecting said first and second sequences, and means for comparing said first and second sequences and operative to generate a control signal only when the displacement between the detected first and second sequences is equal to said one discrete interval.

5. In a selective calling system, first and second oscillators of different frequencies, means for keying said oscillators on and off in accordance with first and second periodic pulse sequences of identical structure, means for selectively displacing said pulse sequences relative to each other by a discrete interval of controllable duration to provide a plurality of addresses, and a receiving station comprising first and second filters respectively tuned to pass signals at said first and second frequencies, first and second detector means respectively coupled to said first and second filters for detecting said first and second pulse sequences, means operative in response to said first pulse sequence arranged to generate a third pulse sequence displaced from said first sequence by an interval corresponding to one of said addresses, means for comparing the detected second pulse sequence with said third pulse sequence and operative to generate a control signal only when the detected second pulse sequence is in time register with said third pulse sequence.

6. In a selective calling system, a transmitter including means for generating first and second maximum length shift register pulse sequences of identical structure, means for selectively displacing said pulse sequences relative to each other by one of a plurality of selectable discrete intervals, each discrete interval constituting an address, a receiving station comprising means for separating and detecting said first and second pulse sequences, means operative in response to the detected first pulse sequence to generate a third pulse sequence identical with said first sequence and displaced from said first sequence by a discrete interval corresponding to said one of said addresses, means for comparing the detected second pulse sequence with said third pulse sequence and operative to generate a control signal only when the detected second pulse sequence is in time register with said third pulse sequence.

7. In a selective calling system, a transmitting station comprising first and second oscillators of different frequency, means for generating first and second pulse sequences of identical structure displaced relative to each other by selectable ones of a plurality of discrete intervals, each discrete interval constituting an address, means for keying said first and second oscillators on and off in accordance with said first and second pulse sequences, respectively, a plurality of receiving stations each including first and second detector means for detecting said first and second pulse sequences, respectively, means connected to the first detector thereof and operative in response to the output thereof to generate a third pulse sequence identical in structure with said first sequence but displaced from said first sequence by one of the discrete intervals by which said first and second sequences are displaced, and circuit means connected to said last-mentioned means and to said second detector and operative to produce an indication that the receiver is being called when said third and second pulse sequences are in time register.

8. In a selective calling system, means for respectively keying first and second oscillators of different frequency on and off in accordance with first and second maximum length shift register sequences of identical structure and displaced relative to each other by one of a plurality of controllable discrete intervals, each discrete interval constituting an address, and a plurality of receiving stations each including frequency selective means for separating and detecting said first and second sequences, means for comparing the structure of the detected first and second sequences, and indicating means unique to each of said receiving stations operative to generate an output signal only when the displacement interval between the first and second sequences detected thereby is equal to the discrete interval constituting the address of the receiver.

9. In a selective calling system, a transmitting station comprising first and second oscillators of different frequencies, first and second shift registers arranged to generate first and second periodic binary pulse sequences of identical structure, means for displacing said sequences relative to each other by selectable ones of a plurality of possible discrete intervals, each discrete interval constituting a calling address, means for keying said first and second oscilaltors on and off in accordance with said first and second sequences, respectively, a plurality of receiving stations, which plurality may be equal to the number of calling addresses, each including first and second frequency selective devices respectively tuned to the frequencies of said first and second oscillators, first and second detecting means respectively connected to said first and second frequency selective means for detecting said first and second pulse sequences, means connected to said first detecting means including a shift register arranged to generate a third pulse sequence of the same structure as said first sequence and displaced from said said first sequence by one of the intervals by which said first and second pulse sequences are displaced from each other, and means for comparing said third pulse sequence with the pulse sequence from said second detecting means and operative when said third and second pulse sequences are in time register to produce an indication that the receiving station is being called.

10. In a selective calling system, a transmitting station comprising first and second oscillators of different frequency, first and second shift registers each having $n$ stages and each being arranged to generate first and second periodic pulse sequences of identical structure and of a length equal to $2^n-1$, means in said second shift register for displacing said second pulse sequence from said first pulse sequence by selected ones of $2^n-1$ discrete intervals, each discrete interval constituting a calling address, means for keying said first and second oscillators on and off in accordance with said first and second pulse sequences, respectively, a plurality of receiving stations, which plurality may be as large as $2^n-1$, each including first and second filters respectively tuned to the frequencies of said first and second oscillators, first and second detectors respectively connected to said first and second filters for detecting said first and second pulse sequences, means including a third shift register and logic means connected to said first detector and operative to generate a third pulse sequence having the same structure as said first pulse sequence and displaced from said first sequence by one of the discrete intervals by which said first and second pulse sequences are displaced from each other, and circuit means connected to said third shift register and to said second detector arranged to generate an indication that the receiver is being called when said third and second pulse sequences are in time register.

11. In a selective calling system, a transmitting station comprising first and second oscillators of different frequency, first and second shift registers each having $n$ stages and each having a logic circuit arranged to synchronously generate first and second periodic pulse sequences of identical structure and a length equal to $2^n-1$, means in said second shift register for displacing said second pulse sequence from said first pulse sequence by selected ones of $2^n-1$ discrete intervals, each discrete interval constituting a calling address, means for keying said first and second oscillators on and off in accordance with said first and second pulse sequences, respectively, and a plurality of receiving stations, which plurality may be as large as $2^n-1$, each including first and second filters respectively tuned to the frequencies of said first and second oscillators, first and second detectors respectively connected to said first and second filters for detecting said first and second pulse sequences, a third shift register having $n$ stages connected to said first detector and operative in response to the output of said first detector upon being triggered in synchronism with said first and second shift registers to generate a third pulse sequence having the same structure as said first and second sequences and displaced from said first sequence by one of the discrete intervals by which said second pulse sequence is displaced from said first pulse sequence, means connected to said first and second detectors for deriving trigger pulses to shift said third shift register in synchronism with said first and second shift registers, and circuit means connected to said third shift register and to said second detector operative to generate an indication that the receiver is being called when said third and said second pulse sequences are in time register.

12. In a selective calling system, a transmitting station comprirsing first and second oscillators of different frequency; first and second shift registers each having $n$ bistable elements, a logic circuit for each of said shift registers each connected to perform modulo 2 addition of the contents of selected elements of its respective register, and pulse generating means connected to both said registers for shifting said registers in synchronism, said first and second shift registers being respectively operative to generate first and second periodic pulse sequences of identical structure and of length $2^n-1$, and switch means connected to the bistable elements of said second register arranged to displace said second pulse sequence relative to said first pulse sequence by selected ones of $2^n-1$ possible discrete intervals, each discrete interval constituting a calling address; means for keying said first and second oscillators off and on in accordance with said first and second pulse sequences, respectively; a plurality of receivers, which plurality may be as large as $2^n-1$, each including first and second filters respectively tuned to the frequencies of said first and second oscillators, first and second detectors respectively connected to said first and second filters for detecting said first and second pulse sequences, means connected to said first detector including a third shift register and logic means operative to generate a third pulse sequence having the same pulse structure as said first pulse sequence and displaced from said first sequence by one of the discrete intervals by which said second pulse sequence is displaced from said first pulse sequence, and circuit means connected to said third shift register and to said second detector operative to generate an indication that the receiver is being called when said third and said second pulse sequences are in time register.

13. In a selective calling system, a transmitting station comprising first and second oscillators of different frequency; first and second shift registers each having $n$ bistable elements, a logic circuit for each of said shift registers each connected to perform modulo 2 addition of contents of selected elements of said registers, and pulse generating means connected to both said registers to shift said registers in synchronism, said registers being arranged respectively to generate first and second periodic pulse sequences of identical structure and of a length equal to $2^n-1$, and switch means connected to the bistable elements of said second register arranged to displace said second pulse sequence from said first pulse sequence by selected ones of $2^n-1$ possible discrete intervals, each discrete interval constituting a different calling address; means for keying said first and second oscillators off and on in accordance with said first and second pulse sequences, respectively; and a plurality of receiving stations, which plurality may be as large as $2^n-1$, each including first and second filters respectively tuned to the frequencies of said first and second oscillators, first and second detectors respectively connected to said first and second filters for detecting said first and second pulse sequences, a third shift register having *n* stages connected to said first detector operative in response to the output of said first detector upon triggering in synchronism with said first and second shift registers to generate a third pulse sequence having the same structure as said first and second sequences and displaced from said first sequence by one of the discrete intervals by which said second pulse sequence is displaced from said first pulse sequence, means connected to said first and second detectors for deriving trigger pulses to shift said third shift register in synchronism with said first and second shift registers, and circuit means connected to said third shift register and to said second detector operative to generate an indication that the receiver is being called when said third and said second pulse sequences are in time register.

14. Apparatus for generating a predetermined number of different calling signals including means for generating first and second periodic pulse words of identical length and structure, the number of bits in each word being equal to said predetermined number, and means for selectively displacing said pulse sequences relative to each other by one of a plurality, equal to said predetermined number, of discrete intervals, each discrete interval constituting a calling address.

15. Apparatus for generating a predetermined number of different calling signals including means for generating first and second periodic pulse words of identical length and structure, the number of bits in each word being equal to said predetermined number, and means for selectively displacing said pulse sequences relative to each other by one of a plurality, equal to said predetermined number, of discrete intervals, each discrete interval constituting a calling address, first and second oscillators of different frequency, and means for keying said first and second oscillators on and off in accordance with said first and second pulse sequences, respectively.

16. Apparatus for generating a plurality of different calling signals comprising, in combination, first and second oscillators of different frequency, means for generating first and second periodic pulse sequences of identical structure, means for selectively displacing said pulse sequences relative to each other by one of a plurality of discrete intervals, each discrete interval constituting a calling address, and means for keying said first and second oscillators on and off in accordance with said first and second pulse sequences, respectively.

17. Apparatus for generating a plurality of different calling signals for selectively addressing a like number of receivers, said apparatus comprising at least two shift registers each having *n* bistable elements and each including logic to generate identical pulse words each of length equal to $2^n-1$ bits, all of said registers except one including means for selectively displacing its pulse sequence with respect to the sequence from said one register by one of $2^n-1$ discrete intervals, each discrete interval constituting a calling address.

18. Apparatus for generating different calling signals for selectively addressing a like number of receivers, said apparatus comprising first and second shift registers each having *n* bistable elements and each including logic to generate first and second identical pulse words each of length equal to $2^n-1$ bits, one of said registers including means for selectively displacing said pulse sequences with respect to each other by one of $2^n-1$ discrete intervals, each discrete interval constituting a calling address, first and second oscillators of different frequency, and means for keying said first and second oscillators on and off in accordance with said first and second pulse sequences, respectively.

19. In a selective calling system wherein the calling signal consists of first and second identical pulse sequences displaced relative to each other by a discrete interval, the discrete interval determining the address being called, receiving apparatus adapted to respond to the calling signal comprising, means for separately detecting said first and second pulse sequences, means operative in response to the detected first pulse sequence to generate a third pulse sequence identical to said first pulse sequence but displaced relative thereto by said discrete interval, and circuit means operative when, and only when, said detected second pulse sequence and said third sequence are in time register to produce a control signal.

20. In a selective calling system, receiving apparatus adapted ot respond to a calling signal consisting of first and second alternating current signals of different frequency respectively on-off modulated in accordance with first and second maximum length shift register pulse sequences of identical structure displaced relative to each other by a discrete interval, the duration of the interval determining the address being called, said receiving apparatus comprising, first and second filters respectively tuned to the frequency of said first and second alternating current signals, first and second detecting means respectively connected to said first and second filters for detecting said first and second pulse sequences, a shift register operative in response to the detected first sequence to generate a third pulse sequence identical to said first pulse sequence and displaced therefrom by said discrete interval, and circuit means connected to said shift register and to said second detecting means and operative to produce a control signal when, and only when, the detected second pulse sequence and said third pulse sequence are in time register.

References Cited in the file of this patent

UNITED STATES PATENTS

| | | |
|---|---|---|
| 2,403,561 | Smith | July 9, 1946 |
| 2,643,368 | Baker | June 23, 1953 |
| 2,643,819 | Yuk Wing Lee et al. | June 30, 1953 |
| 2,658,196 | Burnight et al. | Nov. 3, 1953 |
| 2,740,106 | Phelps | Mar. 27, 1956 |
| 2,874,368 | Sibley | Feb. 17, 1959 |
| 2,976,516 | Taber | Mar. 21, 1961 |